Dec. 25, 1962   G. D. SHELTON-V   3,070,403
METHOD OF TRANSPORTING MATERIALS AND APPARATUS
FOR PERFORMING SAID METHOD
Filed Feb. 15, 1961
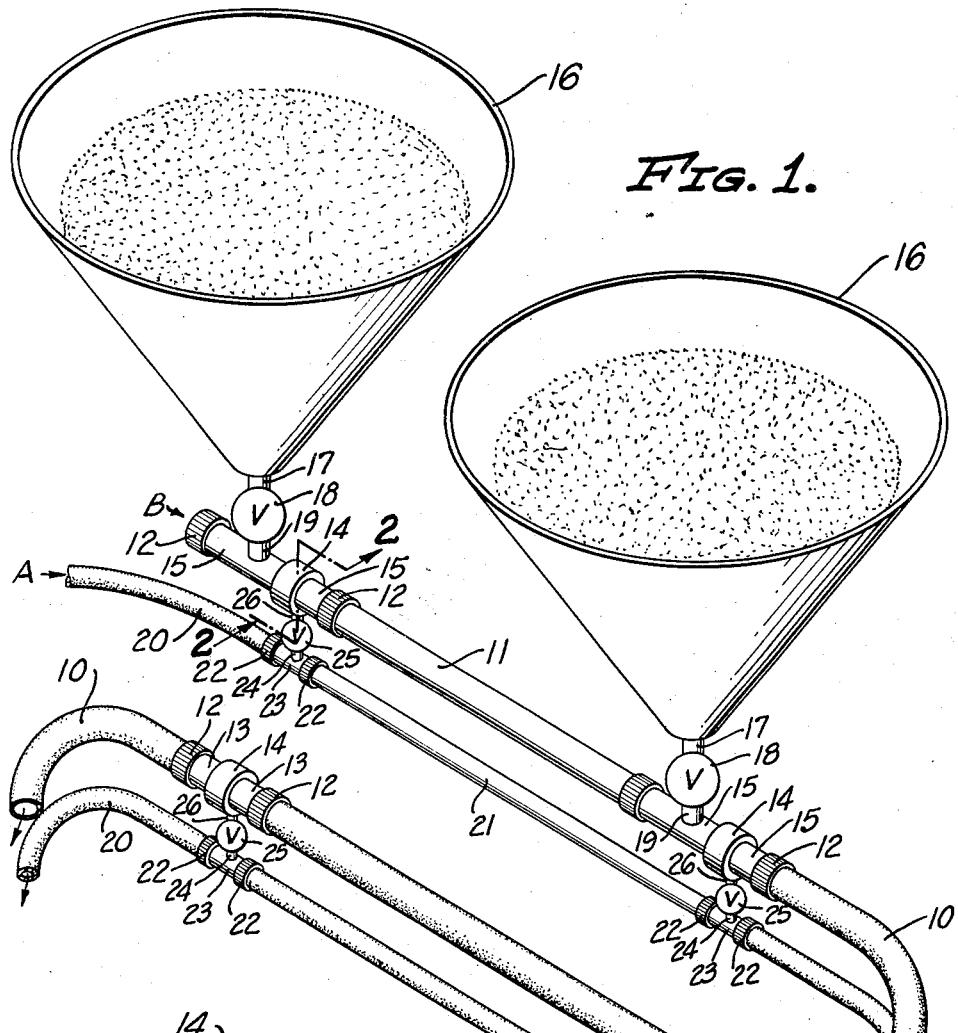
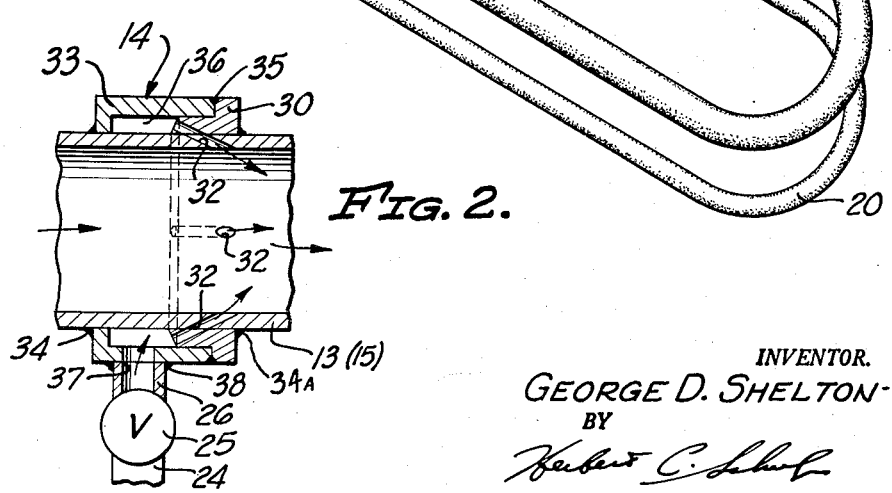
INVENTOR.
GEORGE D. SHELTON-V
BY
ATTORNEY

3,070,403
METHOD OF TRANSPORTING MATERIALS AND APPARATUS FOR PERFORMING SAID METHOD
George D. Shelton-V, 22 N. La Senda, South Laguna, Calif.
Filed Feb. 15, 1961, Ser. No. 89,489
1 Claim. (Cl. 302—52)

This invention relates generally to the transportation of materials and more particularly to a new and improved method for transporting materials by the use of pneumatic streams and to an apparatus for performing said method.

I have observed that the transportation of dry materials such as aggregate, cement, powders of various types, and other similar materials is a very great problem particularly in the building industries, but also in other atcivities. It has particularly been observed by me that dry materials such as sand, gravel and the like are difficult to transport and require either costly and cumbersome equipment or is done in a slow and tedious manner.

I have devised a method of transporting such materials in which I utilize laminar flow of air through a tube as the moving force and by a series of air jets so arranged as to create a proper turbulence and laminar flow and to boost the material at intervals along the line I am able to move large quantities of material with relatively inexpensive and simple equipment and with little or no abrasion upon the conveying tubes. I am also able to move quantities of different materials in the same tube and accomplish thorough mixing of them as they pass through the tube even though they are introduced independently into the moving air streams.

I accomplish the transportation of materials by my method by introducing air in high pressure streams through small inclined orifices at intervals along a line through which material is to be moved and by introducing the materials at various spots but particularly near sources of various air supply booster stations.

Thus, it is an important object of my invention to provide a new means of moving materials using air flow as the transportation means.

It is a further object of this invention to provide an improved method and apparatus for moving materials in a laminar air flow.

It is a further object of this invention to provide a method and apparatus for moving materials in which the abrasive effect of the materials is reduced.

The foregoing and other objects and advantages of this invention will be clear to those skilled in the art upon reading the following specification in conjunction with the attached drawings, in which:

FIGURE 1 is a perspective of a section of a preferred embodiment of the apparatus for carrying out the method of this invention; and FIGURE 2 is a section through 2—2 of FIGURE 1.

It will be observed that a series of lengths of flexible hose 10 each with a coupling 12 upon each end of said hose comprises the conduit for transportation of materials by my method and using this apparatus. Between each pair of hoses 10 there is a coupling unit composed of a pipe 13 adapted to connect to couplings 12 at each end. A collar system indicated generally by the numeral 14, one example of which is shown in detail in FIGURE 2 is affixed around each length of pipe 13 and also around each length of pipe 15 which will be described below.

At the intake end of the series of flexible hoses 10 there is a length of pipe 15 connected through coupling 12 to the hose. This pipe 15 has a collar 14 as will be described in detail in connection with FIGURE 2 and is also provided with pipe 19 into valve 18 and pipe 17 into valve 18. A hopper 16 containing material to be fed into the line is attached to pipe 17 and its flow into the line controlled by valve 18. A pipe 11 may be used to connect repeated lengths of pipe 15 and additional material hopper systems, each of which will be identical.

A series of smaller air pressure hoses 20 are connected through couplings 22 to short lengths of pipe 23 having an air outlet pipe 24, a valve 25 and an air pipe 26 interconnected to collars 14, which will be described in detail below. Rigid pipes 21 are used between the lengths of pipe 23 as necessary to carry the air line along the same path as rigid paths 11 may be used between material hoppers. A source of air under pressure is provided at A into air pressure hose 20.

It will be observed that the various units 14 are all identical and each is as illustrated in FIGURE 2. In each case, the pipe length 13 or 15, as the case may be, is provided with a collar 30 welded or otherwise firmly attached at 34a. A series of small holes 32, each forwardly inclined as indicated in FIGURE 2, is provided about the circumference of the pipe 13 or 15 as the case may be, and through its wall and the wall of collar 30 as illustrated. The holes 32 should be at equal spaced distance and in the illustration indicated there would be four holes about the circumference. A second collar 33 is welded or otherwise firmly affixed about the pipe 13 or 15 as the case may be, at 34. This second collar is also welded to collar 30 at 35. Thus, an air chamber 36 is created about the circumference of the pipe 13 or 15. The air supply line 26 is welded at 38 to the collar 33 and a hole 37 intercommunicates between the interior of the chamber 36 and the inside of air supply line 26. The valve 25 of customary construction controls the flow of air from intake 24 to 26 and thus into chamber 36 from whence it flows through holes 32 in a forwardly direction as indicated by the arrows in FIGURE 2.

In practice a source of air under pressure is supplied to the air supply line at A. A series of materials to be transported will be placed in material hoppers 16 and connected together as illustrated in FIGURE 1. The proper amounts of material to be fed from each hopper 16 will be regulated by the valves 18 and thus allowed to drop into the air line. Air will be supplied to each of the valves 25 into the various coupling units 14 along the line and this air will flow into the line at an angle as indicated in FIGURE 2 thus creating a laminar flow of air through the tubes. This laminar flow will be moving at high speed in the center and at relatively low speed along the edge of the tubes 11 and 10. Thus the material flowing into the line will be literally floated in the center of this fast air stream and will be held in this manner by the laminar flow so that it does not abraid against the interior walls of the tube with any appreciable effect.

Depending upon the length of the overall lines and the number of material supply hoppers 16 used the amount of air flowing into each unit 14 may be controlled so as to create the proper degree of pressure at each point along the line and the proper degree of speed and turbulence.

It will be observed that materials coming from a number of like hoppers 16 will be intermixed in the laminar flow of air and after traveling a short distance will be thoroughly intermixed so as to create a very excellent mixture for such uses as the material may be desired at its discharge point.

It will be clear that a plug, or cap, will be inserted at point B or additional hoppers will be extended along this end and at the final hopper a plug, or cap, must be inserted at B to close the end. It may be desirable in some cases to leave this end open if a free supply of air is desired for special purposes in addition to the supply of air through valve 25 at various points along the way.

However, in general a plug, or cap, will probably be used at this position.

In a typical operation aggregate might be placed in one of the hoppers 16 illustrated in FIGURE 1 and cement might be placed in the other hopper. The control of the supply of each of these materials through pipes 17 and 19 into pipes 15 will be by means of valves 18. In each case the respective ring 14 will create a suction and pushing effect upon the material as it flows into pipe 15 and will take it forward towards the hoses 10. As the material from the two supply hoppers feeds into the hose 10 it will become intermixed in the line and will be boosted along the way at each additional coupling unit 14. At the ultimate end the last air line 20 there will be a cap to prevent loss of air and at the ultimate end of line 10 there may be an opening to discharge the material as it comes forward or a suitable spray gun, such as a gunite type spray head in which water or other material might be fed could be attached and the material could be used in this manner directly from the hose 10. This will be a simple matter of choice.

In each case the flow of air will be controlled through the valves 25.

The couplings 12 and 22 joining hoses 10 and 20 respectively to pipes 15 or 13 and 23 respectively may be of any customary design including a quick coupling type.

While the embodiment of this invention particularly shown and described in this application is fully capable of performing the objects and advantages desired it will be apparent to those skilled in the art that many modifications may be made without departing from the inventive concepts disclosed herein. It is not my intention to be limited by the specific embodiments illustrated.

I claim:

Apparatus for conveying and boosting materials, comprising:
(a) a material conduit;
(b) spaced valve controlled material hoppers communicating with said conduit;
(c) an air pressure hose following said material conduit; and
(d) means for propelling material through said conduit, including valve controlled couplings between said air hose and conduit, said couplings including circumferential conduit air chambers having spaced forwardly directed slits through which air pressure suspends and boosts said material in laminar flow along the center of said conduit.

References Cited in the file of this patent

UNITED STATES PATENTS

| | | |
|---|---|---|
| 671,774 | Prosser | Apr. 9, 1901 |
| 1,202,088 | Murray | Oct. 24, 1916 |
| 1,943,780 | Allen | Jan. 16, 1934 |
| 2,874,999 | Lofgren | Feb. 24, 1959 |
| 2,946,628 | Bauregger | July 26, 1960 |